(12) United States Patent
Takeda (10) Patent No.: US 6,996,044 B2
(45) Date of Patent: Feb. 7, 2006

(54) OPTICAL DISK APPARATUS

(75) Inventor: Naoto Takeda, Tokyo (JP)

(73) Assignee: TEAC Corporation, Tokyo (JP)

( * ) Notice: Subject to any disclaimer, the term of this patent is extended or adjusted under 35 U.S.C. 154(b) by 495 days.

(21) Appl. No.: 10/253,855

(22) Filed: Sep. 24, 2002

(65) Prior Publication Data

US 2003/0058769 A1 Mar. 27, 2003

(30) Foreign Application Priority Data

Sep. 27, 2001 (JP) ............................. 2001-295766

(51) Int. Cl.
*G11B 7/00* (2006.01)
(52) U.S. Cl. .............. 369/53.22; 369/53.23; 369/53.27; 369/44.28
(58) Field of Classification Search ............. 369/30.1, 369/44.26, 44.27, 53.22, 53.26, 53.37, 59.11, 369/59.23, 53.27, 44.28, 47.27, 47.35; 336/336, 336/212, 178, 229

See application file for complete search history.

(56) References Cited

U.S. PATENT DOCUMENTS

| 5,508,991 | A | * | 4/1996 | Onigata et al. ........... 369/44.13 |
| 5,568,461 | A | * | 10/1996 | Nishiuchi et al. ............ 336/212 |
| 5,850,378 | A | * | 12/1998 | Ninamino et al. ........ 369/59.11 |
| 6,262,950 | B1 | * | 7/2001 | Narahara et al. .......... 369/30.1 |
| 6,577,566 | B1 | * | 6/2003 | Tomita ..................... 369/44.26 |

FOREIGN PATENT DOCUMENTS

| JP | HEI 08-180429 | 7/1996 |
| JP | HEI 09-231588 | 9/1997 |
| JP | HEI 10-027354 | 1/1998 |
| JP | HEI 10-064068 | 6/1998 |

* cited by examiner

*Primary Examiner*—William Korzuch
*Assistant Examiner*—Kim-Kwok Chu
(74) *Attorney, Agent, or Firm*—Christensen O'Connor Johnson Kindness PLLC (57) ABSTRACT

An optical disk apparatus for recording and reproducing data using a grove and a land of an optical disk. For data recording and reproducing using a groove, a groove focus position is used. For data recording and reproducing using a land, a land focus position is used. When shifting from a groove to a land or vice versa, a boost amount of an equalizer or power of a laser beam is temporarily increased for compensation of delay in response of a focus actuator.

20 Claims, 9 Drawing Sheets

OPTICAL DISK APPARATUS

BACKGROUND OF THE INVENTION

1. Field of the Invention

The present invention relates to an optical disk apparatus, and, in particular, to an optical disk apparatus, such as a DVD-RAM, for data recording/reproduction using a land and a groove.

2. Description of the Related Art

Besides a technique such as CD-R/RW for data recording/reproduction using grooves of optical disks, a technique such as DVD-RAM for improving recording density utilizing not only grooves but also lands is also known. According to such a technique, data is recorded in one pitch of a spirally formed groove and, after shifting the laser beam to a land adjacent to the groove, then recorded in one pitch of that land. Thereafter, the laser beam is again shifted to the adjacent groove for continuation of data recording. In this manner, data recording is continued alternately using a groove and a land, namely, a groove, a land, a groove, a land, and so forth.

Here, due to a difference in distance, and so forth, from an optical pick-up to a land and to a groove, the optimum optical focus (FS) offsets for use in data recording/reproduction differ between grooves and lands. Therefore, different FS offsets are prepared for data recording/reproduction which uses both of grooves and lands, so that a groove FS offset is used in data recording/reproduction using a groove, and a land FS offset is used in data recording/reproduction using a land.

Figure 8A:
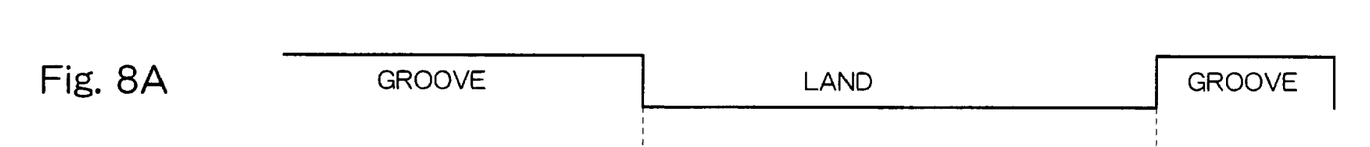
FIG. 8A is a timing chart for reproduction using a groove and a land.
Figures 8B, 8C:
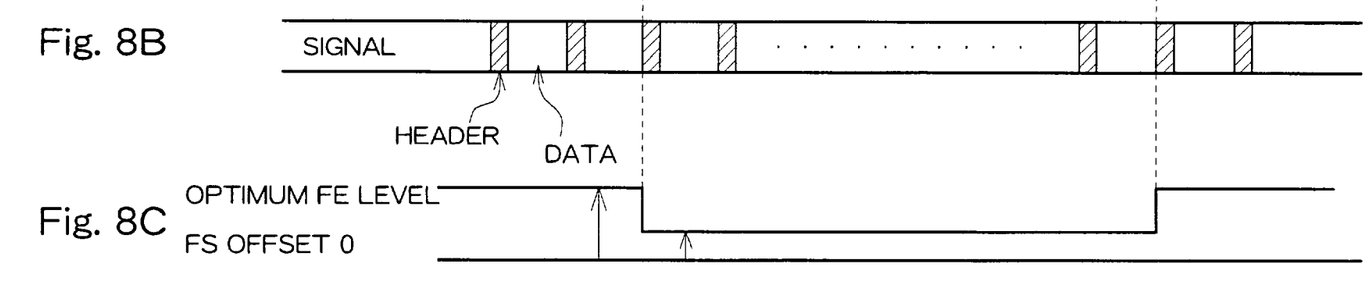
FIG. 8B is a timing chart showing a signal format.
FIG. 8C is a timing chart showing the optimum focus error signal level.

FIGS. 8A to 8D show switching of reproduction FS offsets in a DVD-RAM drive. As shown in FIG. 8A, a groove and a land are alternately used in data reproduction. As shown in FIG. 8B, a groove and a land each have a header which contains address information and a data portion which stores actual data. FIG. 8C shows the optimum reproduction FS offsets, in which a groove reproduction FS offset is set in reproduction using a groove, and a land reproduction FS offset is set in reproduction using a land. Ideally, swift switching of FS offsets is required in shifting from a groove to a land and vice versa. Note that the optimum FE level in FIG. 8C means the optimum focus error signal level, which is obtained by adding the optimum FS offset value and a focus error signal which is obtained from a reproduction RF signal. Operating a focus servo based on the optimum FE level enables adjustment of the object lens position at the optimum value.

Figure 8D:
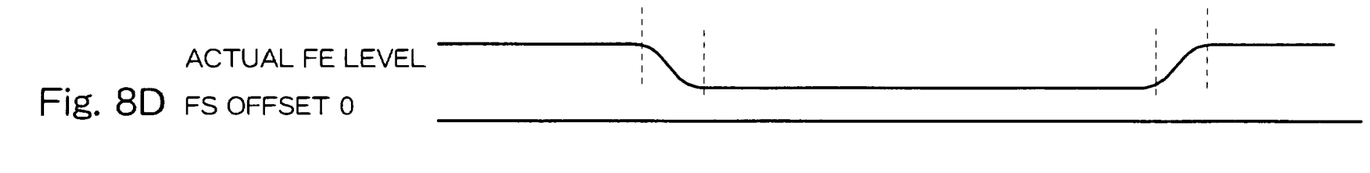
FIG. 8D is a timing chart showing an actual focus error signal level.

However, a response frequency of a focus actuator which drives the object lens in the optical pick-up is about 2 kHz, which is not fast enough to respond immediately to the switching of FS offsets when shifting from a land to a groove or vice versa. Therefore, when shifting, for example, from a groove to a land, a period is caused, as shown in FIG. 8D, at the beginning of the reproduction using the land, during which data cannot be reproduced using a land reproduction FS offset. Likewise, a period is caused in shifting from a land to a groove, during which data cannot be reproduced using a grove reproduction FS offset.

Figure 9:
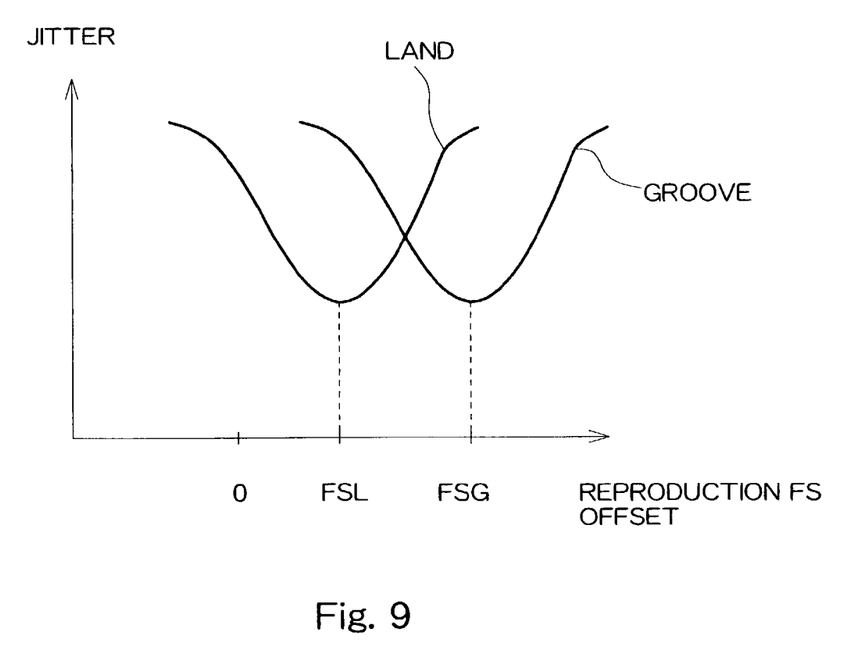
FIG. 9 is a graph showing relationship between a reproduction focus offset and a jitter.

FIG. 9 shows a relationship between a reproduction FS offset and jitter. In the drawing, the abscissas indicates reproduction FS offsets, FSG representing the optimum groove reproduction FS offset and FSL representing the optimum land groove reproduction FS offset.

When shifting from a land to a groove, FSL must be swiftly switched to FSG. In actuality, however, this swift switching is not achievable due to delay in response, as described above. This causes jitter to increase in reproduction of data recorded in a groove and thus deteriorates reproduction quality. Likewise, because FSG cannot be switched swiftly to FSL when shifting from a groove to a land, jitter increases in reproduction of data recorded in a land.

This problem, described above in connection with data reproduction, is also caused in data recording using a land and a groove. That is, because the optimum groove and land recording FS offsets cannot be quickly switched from one to the other, data cannot be recorded using the optimum groove recording FS offset when shifting, for example, from a land to a groove, and data recording quality is resultantly deteriorated.

SUMMARY OF THE INVENTION

The present invention aims to provide an optical disk apparatus capable of suppressing deterioration of data recording and reproducing quality even when shifting from a groove to a land and vice versa.

According to one aspect of the present invention, there is provided an optical disk apparatus comprising means for irradiating a laser beam alternately to a groove and a land of an optical disk;

means for receiving a returned beam from the optical disk to output as an RF signal;

an equalizer for boosting at least a portion of the RF signal; and means for demodulating data based on a signal from the equalizer. The equalizer may increase a boost amount when shifting between the groove and the land.

The optical disk apparatus may further comprise means for irradiating a laser beam alternately to a groove and a land of an optical disk to record data therein, and means for adjusting power of the laser beam. The means for adjusting may increase power of the laser beam when shifting between the groove and the land.

In an embodiment of the present invention, the equalizer may increase a boost amount for a predetermined amount of time from beginning of shifting from the land to the groove or shifting from the groove to the land.

In an embodiment of the present invention, the equalizer may increase a boost amount for a predetermined number of sectors from beginning of shifting from the land to the groove or shifting from the groove to the land.

In an embodiment of the present invention, the means for adjusting may increase power of the laser beam for a predetermined amount of time after beginning of shifting from the land to the groove or shifting from the groove to the land.

In an embodiment of the present invention, the means for adjusting may increase power of the laser beam for a predetermined number of sectors or data items from beginning of shifting from the land to the groove or shifting from the groove to the land.

In the optical disk apparatus of the present invention, in consideration of the insufficiently fast response of a focus actuator when shifting from a groove to a land or vice versa, a boost amount in the equalizer or power of the laser beam may be temporarily increased. Such temporary increase can compensate for deterioration of reproduction quality or a drop of laser beam power, which is caused when the focus position is not set at the optimum position due to delay in response. A period of time with an increased boost amount or increased laser beam power can be determined based on a response speed of the focus actuator.

The present invention is applicable to any drive which records and reproduces data using a groove and a land of an optical disk.

The present invention will be more clearly understood with reference to the following embodiment, but to which the present invention is no limited.

DESCRIPTION OF THE PREFERRED EMBODIMENT

In the following, an embodiment of the present invention will be described taking a DVD-RAM drive as an example with reference to the accompanied drawings.

Figure 1:
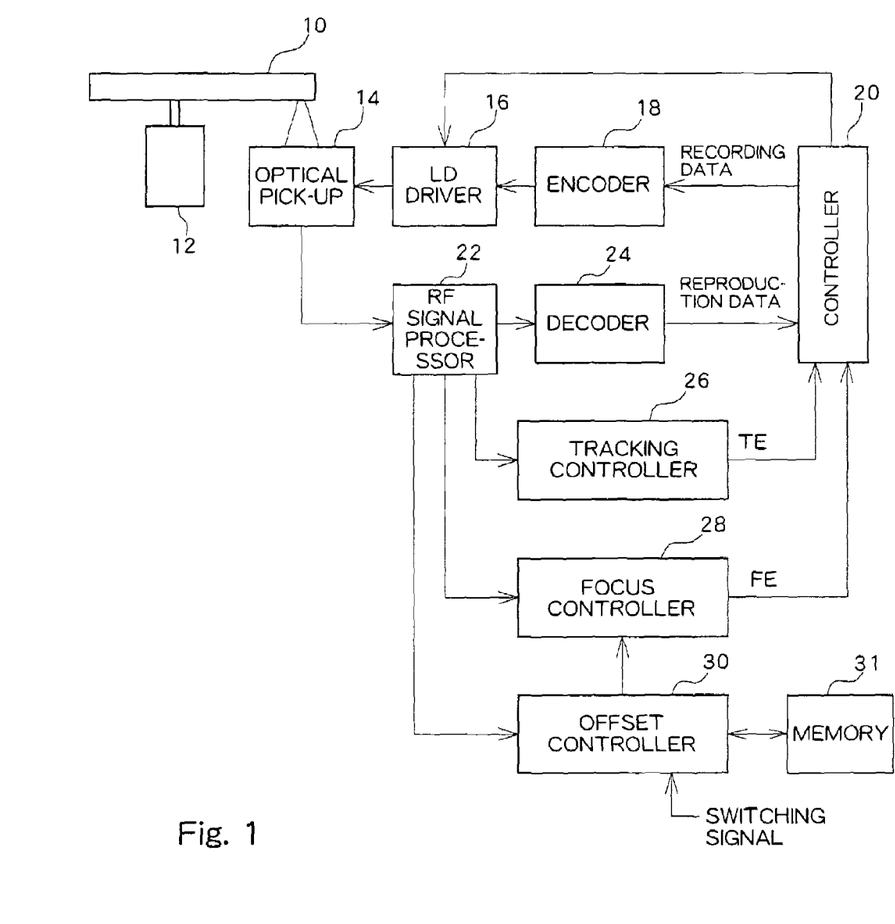
FIG. 1 is a block diagram showing the structure of an optical disk apparatus.

FIG. 1 is a block diagram showing a structure of an optical disk apparatus according to an embodiment of the present invention. An optical disk 10 is driven for CAV (or CLV) rotation by a spindle motor 12.

An optical pick-up 14 is located opposite to the optical disk 10, and irradiates the optical disk 10 with recording power laser beams for data recording, and with reproducing power laser beams for recorded data reproduction. In data recording, recording data supplied from the controller 20 is modulated by an encoder 18, and then converted into a drive signal by an LD driver 16 to drive a laser diode (LD) in the optical pick-up 14. In data reproduction, an amount of a returned beam, which is converted into an electric signal in four-segment photo detectors in the optical pick-up 14, is supplied to an RF signal processor 22 and then to a decoder 24 for demodulation, so that the resultant reproduction data is supplied to the controller 20.

The RF signal processor 22, which comprises an amplifier, an equalizer, a binarizer, a PLL, and so forth, boosts and then binarizes an RF signal, and creates a synchronous clock to output to the decoder 24.

The tracking controller 26 creates a tracking error signal TE from a reproduction RF signal to supply to the controller 20. In this embodiment, conveniently, the controller 20 has a tracking servo function. It will be easily appreciated that a separate tracking servo circuit may be provided, besides the controller 20, to which a tracking error signal TE will be supplied.

The focus controller 28 generates a focus error signal FE from a reproduction RF signal for supply to the controller 20. Similarly to the tracking control, a separate focus servo controller may be provided, besides the controller 20, to which a focus error signal FE will be supplied.

The offset controller 30 calculates the optimum FS offset value from a reproduction RF signal for supply to the focus controller 28. Specifically, the offset controller 30 calculates reproduction and recording FS offsets which minimize jitter of a reproduction RF signal, and records them in a memory 31 so that it can supply a reproduction FS offset in data reproduction and a recording FS offset in data recording, respectively, to the focus controller 28. Receiving the offset from the offset controller 30, the focus controller 28 adds the offset to a focus error signal which is generated from an RF signal, and supplies the resultant focus error signal FE to the controller 20 or a focus servo circuit. Moreover, the offset controller 30 separately prepares a land FS offset and a groove FS offset as a land and a groove of an optical disks 10 are both utilized in data recording/reproduction in this embodiment, so that it can supply a land FS offset in data recording/reproduction using a land, and a groove FS offset in data recording/reproduction using a groove.

That is, the offset controller 30 calculates these four types of FS offsets, namely, a land recording FS offset, a land reproducing FS offset, a groove recording FS offset, and a groove reproducing FS offset, and records them all in the memory 31. Which one of these four types of FS offsets is to be supplied to the focus controller 28 is determined based on a switching signal from the controller 20. Specifically, for a switching signal from the controller 20 indicative of data recording/reproduction using a land, either a land recording or reproduction FS offset is supplied. Likewise, for a switching signal indicative of data reproduction/recording using a groove, either a groove recording or reproducing FS offset is supplied.

It should be noted that the offset controller 30 may also calculate and record the optimum offset for tracking to supply to the tracking controller 26.

The controller 20, which comprises a microcomputer, or the like, supplies recording data to the encoder 18 and receives reproduction data from the decoder 24 to forward to a superior device. In addition, based on a header signal contained in a signal from the decoder, the controller 20 controls timing at which to shift from recording/reproduction using a land to that using a groove or vice versa, and supplies a switching signal for switching between a land and a groove to the offset controller 30.

Figure 2:
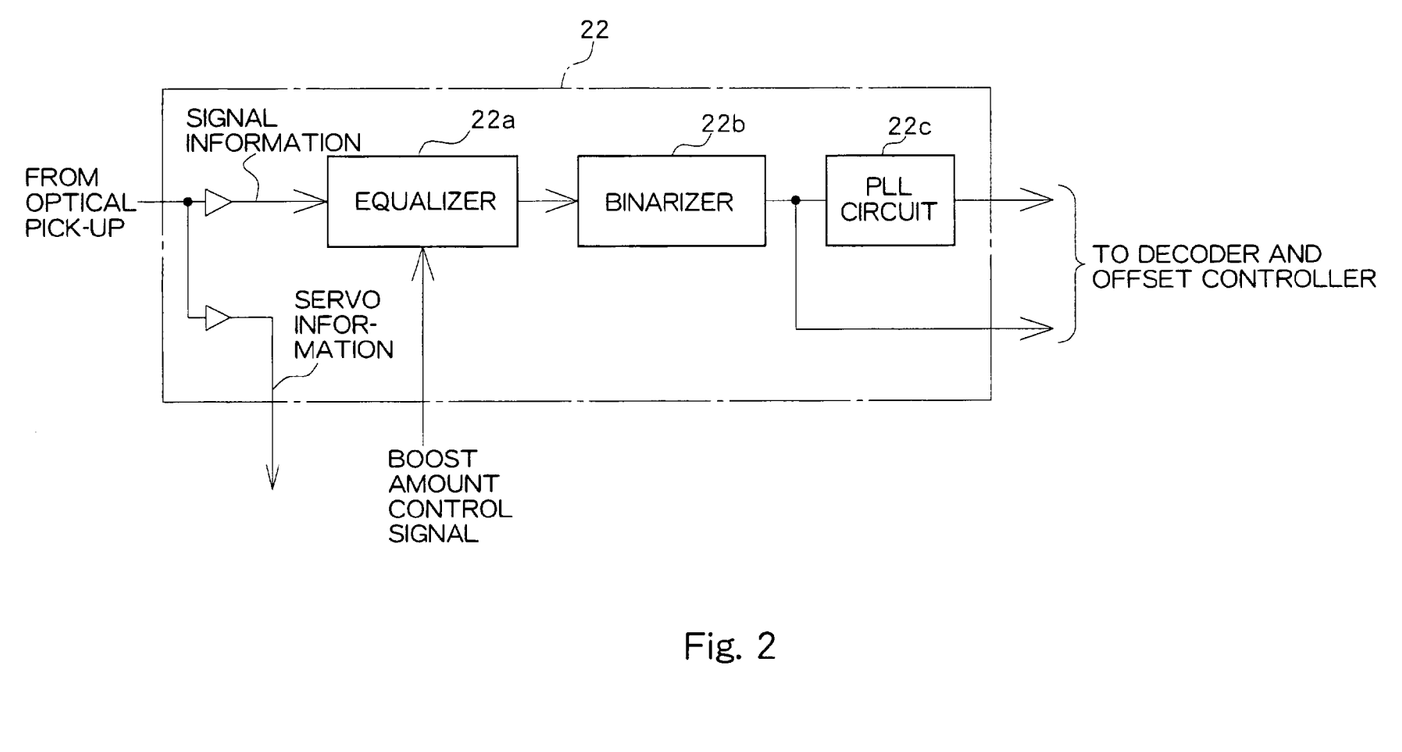
FIG. 2 is a block diagram showing the structure of an RF signal processor of FIG. 1.

FIG. 2 is a block diagram showing a structure of the RF signal processor 22 of FIG. 1. The RF signal processor 22 comprises an equalizer 22a, a binarizer 22b, and a PLL circuit 22c. Signal information from the optical pick-up 14 is supplied to the equalizer 22a, while servo information is supplied to the tracking controller 26 and the focus controller 28.

The equalizer 22a boosts only a signal of a predetermined frequency, for example, a 3T signal, among RF signals supplied from the optical pick-up 14 by a predetermined amount, for example, 3 dB, and supplies the result to the binarizer 22b. A 3T signal is boosted to thereby increase its level, as described above, because recording of a 3T signal is generally difficult due to the shortness of its pulse length and it is thus considered that a relevant pit is formed only poorly and that the level of a relevant reproduction signal is small. In addition, because generation probability of 3T signals is large, reliable reproduction of 3T signals enables overall error rate reduction. An RF signal boosted in the equalizer 22a is supplied to the binarizer 22b.

The binarizer 22b binarizes the boosted RF signal using a predetermined threshold, and supplies the result to the PLL circuit 22c. The PLL circuit 22c creates a clock in synchronism with an input binarized signal, and supplies the clock to the decoder 24 and the offset controller 30.

The decoder 24 decodes the binarized signal based on the synchronous clock, and supplies the resultant reproduction data to the controller 20.

The offset controller 30 calculates a jitter value based on a difference, or a phase difference, in rising and falling timing between the binarized signal and the synchronous clock and also an offset value which minimizes the jitter, and records the calculated offset value in the memory 31. Note that the offset controller 30 calculates FS offsets of the types described above.

While a boost amount in the equalizer 22a remains consistent in a conventional drive, a boost amount for a 3T signal is desirably determined in this embodiment based on a boost amount control signal supplied from the controller 20 to the equalizer 22a. Specifically, a signal is boosted by a consistent amount, for example, 3 dB, for data reproduction using a land or a groove, a signal is boosted by an amount larger by a predetermined amount, for example 6 dB, when shifting from a land to a groove or vice versa.

Figure 3A:
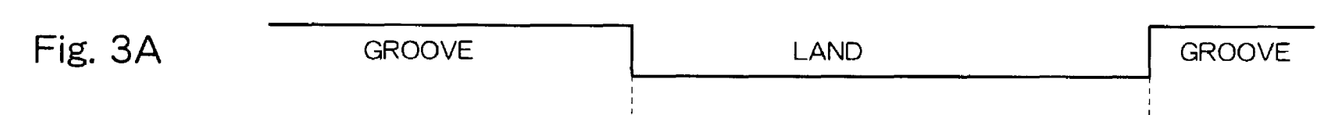
FIG. 3A is a timing chart showing reproduction using a groove and a land.
Figure 3B:
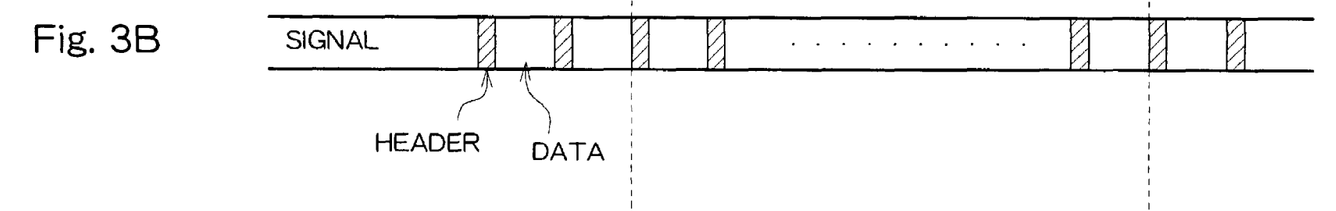
FIG. 3B is a timing chart showing a signal format.
Figure 3C:
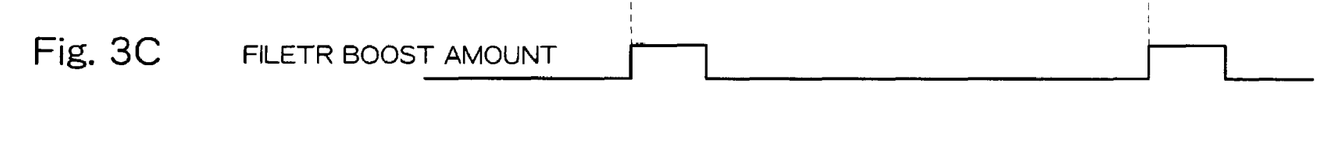
FIG. 3C is a timing chart showing a boost amount of a filter or an equalizer.

FIGS. 3A to 3C show variation of a boost amount in the equalizer 22a in this embodiment. FIGS. 3A and 3B respectively describe, similar to FIGS. 8A and 8B, that data reproduction is performed using alternately a groove and a land, and that each groove and land has a header and data. FIG. 3C shows variation of boost amount in the equalizer 22a as data reproduction proceeds using alternately a groove and a land. Specifically, a boost amount remains constant in reproduction using a groove or a land, and is temporarily increased by a predetermined amount, for example, 6 dB, when shifting from a groove to a land or a vice versa.

As described above, temporary increase of a boost amount in the equalizer 22a when shifting from a groove to a land or a vice versa can compensate for deviation from the optimum FS offsets due to delay in response by a focus actuator, and thereby suppresses deterioration of reproduction quality. That is, when shifting, for example, from a groove to a land, data is reproduced using an FS offset value between groove and land FS offsets during a period at the beginning of the reproduction using a land because a land reproducing FS offset is yet to be set (see FIG. 8D). Even so, because a boost amount in the equalizer 22a and thus the level of a reproduction RF signal are also increased and maintained so during this period, a drop of a reproduction level due to the deviation from an FS offset can be compensated for and desirable reproduction quality can thus be maintained.

This is also the case when shifting from a land to a groove. Specifically, due to delay in response by the focus actuator, a groove reproduction FS offset is yet to be set during a period at the beginning of the reproduction using a groove, and therefore data is reproduced using an FS offset between land and groove FS offsets. Even so, because a boost amount in the equalizer 22a and thus the level of a reproduction RF signal also are increased and maintained so during this period, a drop of a reproduction level due to the deviation from an FS offset can be compensated for and desirable reproduction quality can thus be maintained.

Figure 4:
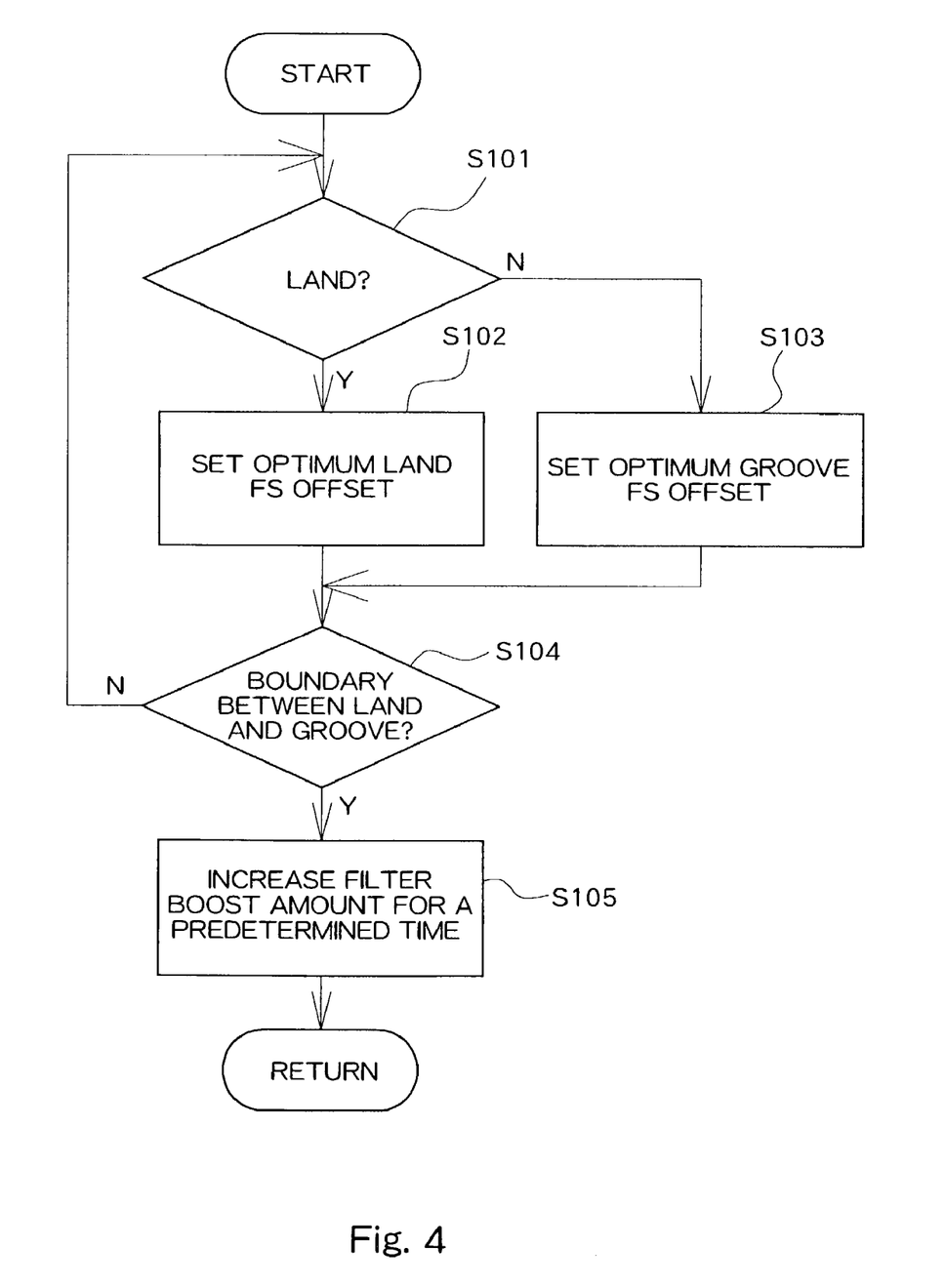
FIG. 4 is a flowchart of controlling a boost amount of an equalizer.

FIG. 4 is a flowchart of processing in this embodiment. Specifically, the controller 20 determines if data for reproduction is obtained from a land (S101). When it is, the controller 20 supplies a land switching signal to the offset controller 30. In response, the offset controller 30 supplies the optimum land reproduction FS offset to the focus controller 28 to proceed data reproduction (S102). When it is not, that is, when data is obtained from a groove, on the other hand, the controller 20 supplies a groove switching signal to the offset controller 30, which, in turn, supplies the optimum groove reproduction FS offset to the focus controller 28 to proceed data reproduction (S103).

As data reproduction using either a land or a groove proceeds until it reaches a boundary between a land and a groove, or a point at which to shift from a land to a groove or vice versa (S104), the controller 20 supplies a boost amount control signal to the equalizer 22a so that a boost amount is increased and maintained so for a predetermined amount of time, for example, 500 µs, after the beginning of the shifting (S105).

Figure 5:
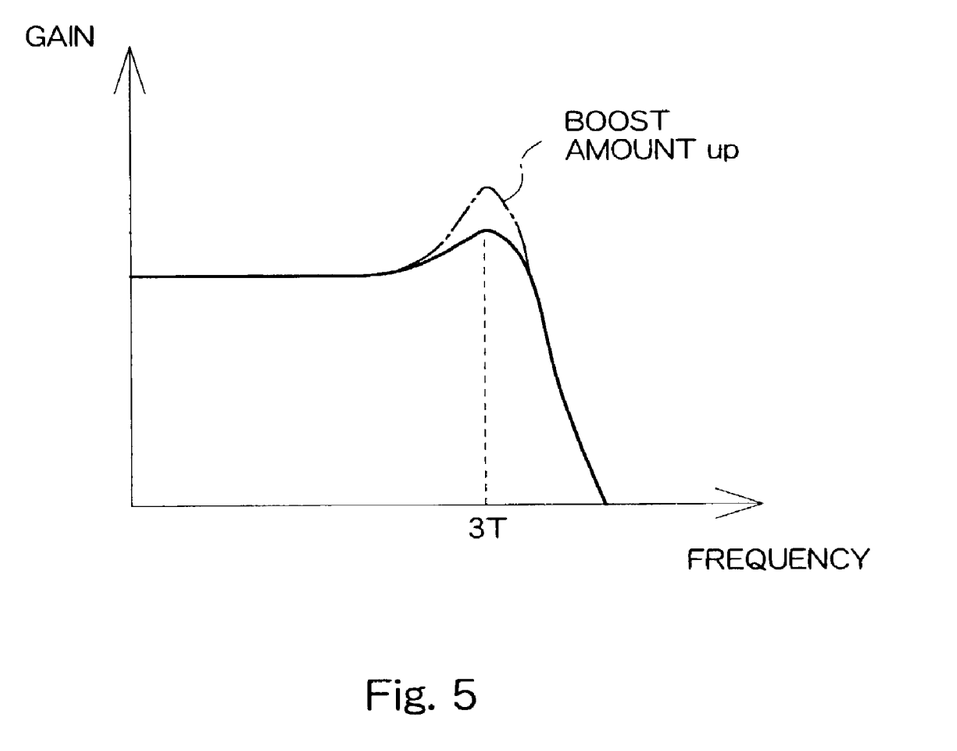
FIG. 5 is a graph showing variation in boost amount of an equalizer.
Figure 6A:
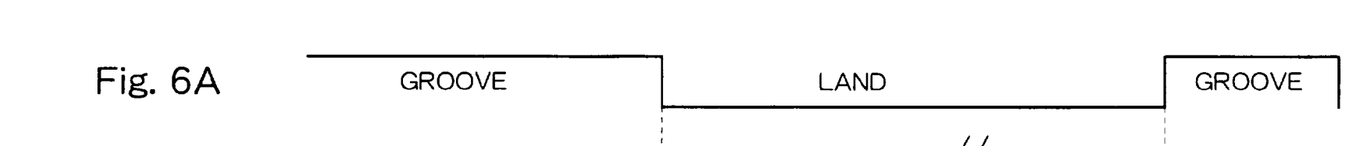
FIG. 6A is a timing chart for recording using a groove and a land.
Figure 6B:
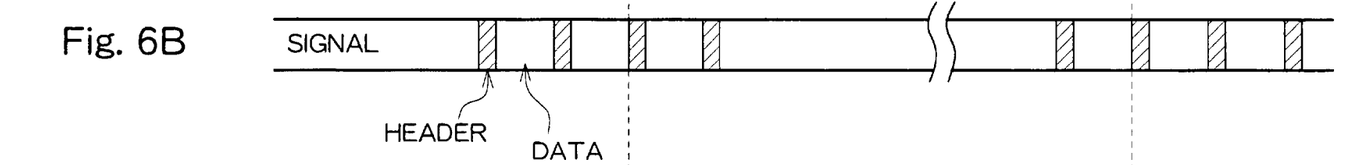
FIG. 6B is a timing chart showing a signal format.
Figure 6C:
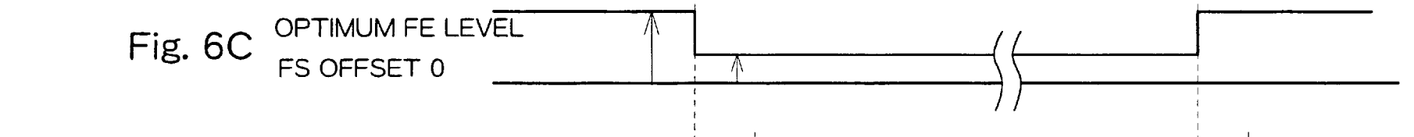
FIG. 6C is a timing chart showing the optimum focus error signal level.
Figure 6D:
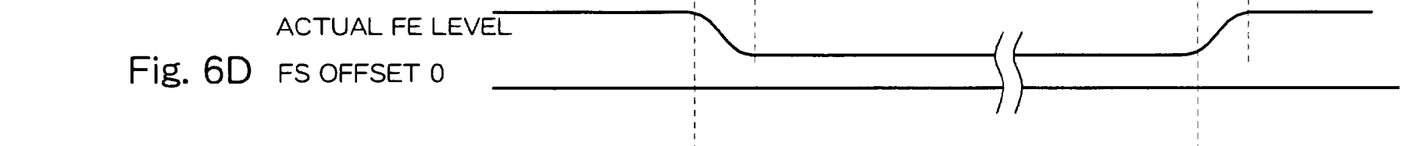
FIG. 6D is a timing chart showing an actual focus error signal level.
Figure 6E:
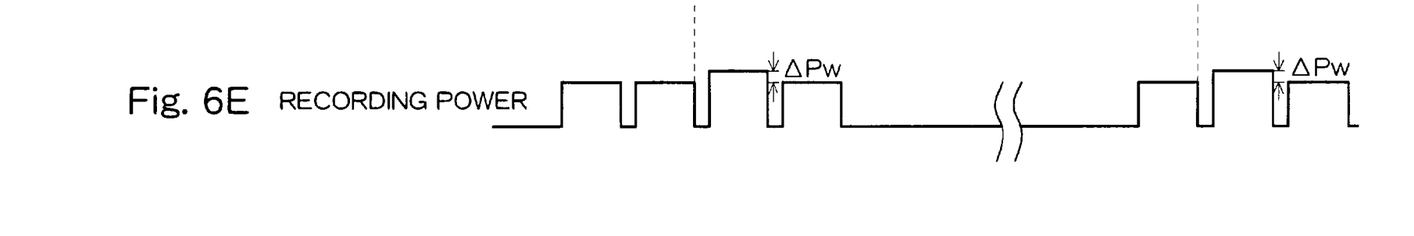
FIG. 6E is a timing chart showing recording power (peak power)

FIG. 5 shows frequency characteristics of the equalizer 22a. In the drawing, the abscissa indicates frequencies, while the ordinate indicates gains. The equalizer 22a boosts a 3T signal among RF signals by a predetermined amount for output. When shifting from a land to a groove or vice versa, a boost amount is temporarily increased as shown by the dot and dash line in the drawing. It should be noted that frequencies of signals other than a 3T signal may be boosted.

It should be noted that the period of time when shifting from a land to a groove or vice versa, during which an increased boost amount is maintained in this embodiment, is preferably determined in accordance with a time of response of the focus actuator. That is, an increased boost amount may be maintained for a time Δt, a time necessary for FSL to switch to FSG or vice versa.

In this embodiment, an increased boost amount may be maintained for a predetermined number of sectors from the beginning of the shifting, instead of a predetermined amount of time in the shifting. For example, when shifting from a land to a groove, an increased boost amount may be maintained for three sectors in the groove to which the operation shifts, and so forth. The number of sectors may be determined in accordance with a response speed of the focus actuator or a rotation speed of the optical disk 10.

Also, in this embodiment, the boost amount may be increased by a variable amount, such as is determined in accordance with a difference between land and groove reproduction FS offsets, that is, FSG minus FSL, and so forth, rather than a fixed amount, such as 6 dB.

FIGS. 6A to 6F are other timing charts. As described above, deterioration of reproduction quality which would occur in the shifting can be suppressed through adjustment of a boost amount in the equalizer 22a for data reproduction. Similarly, deterioration of recording quality which would occur in the shifting can be suppressed through adjustment of recording power for data recording.

FIGS. 6A to 6D, corresponding to FIGS. 8A to 8D, show variation of the optimum FS focusing offsets in data recording. Similar to a reproduction FS offset, due to insufficiently fast_response characteristics of the focus actuator, the optimum land and groove FS offsets cannot be switched from one to the other quickly enough when shifting from a land to a groove or vice versa.

In view of the above, in this embodiment, the controller 20 supplies a control signal to the LD driver 16 when shifting from a groove to a land or vice versa (see FIG. 1), so that recording power (peak power) of a laser beam emitted from the optical pick-up 14 and irradiating the optical disk 10 is temporarily increased by ΔPw.

Specifically, the recording power may be increased and maintained so for a predetermined number of sectors (one sector in FIG. 6E) or for a predetermined amount of time after beginning of the shifting. Alternatively, recording power may be increased only during a period from the beginning of the shifting to formation of an initial mark. An amount of increase for the recording power may be a fixed value, such as 15%, or may vary depending on a difference between land and groove FS offsets.

Figure 7:
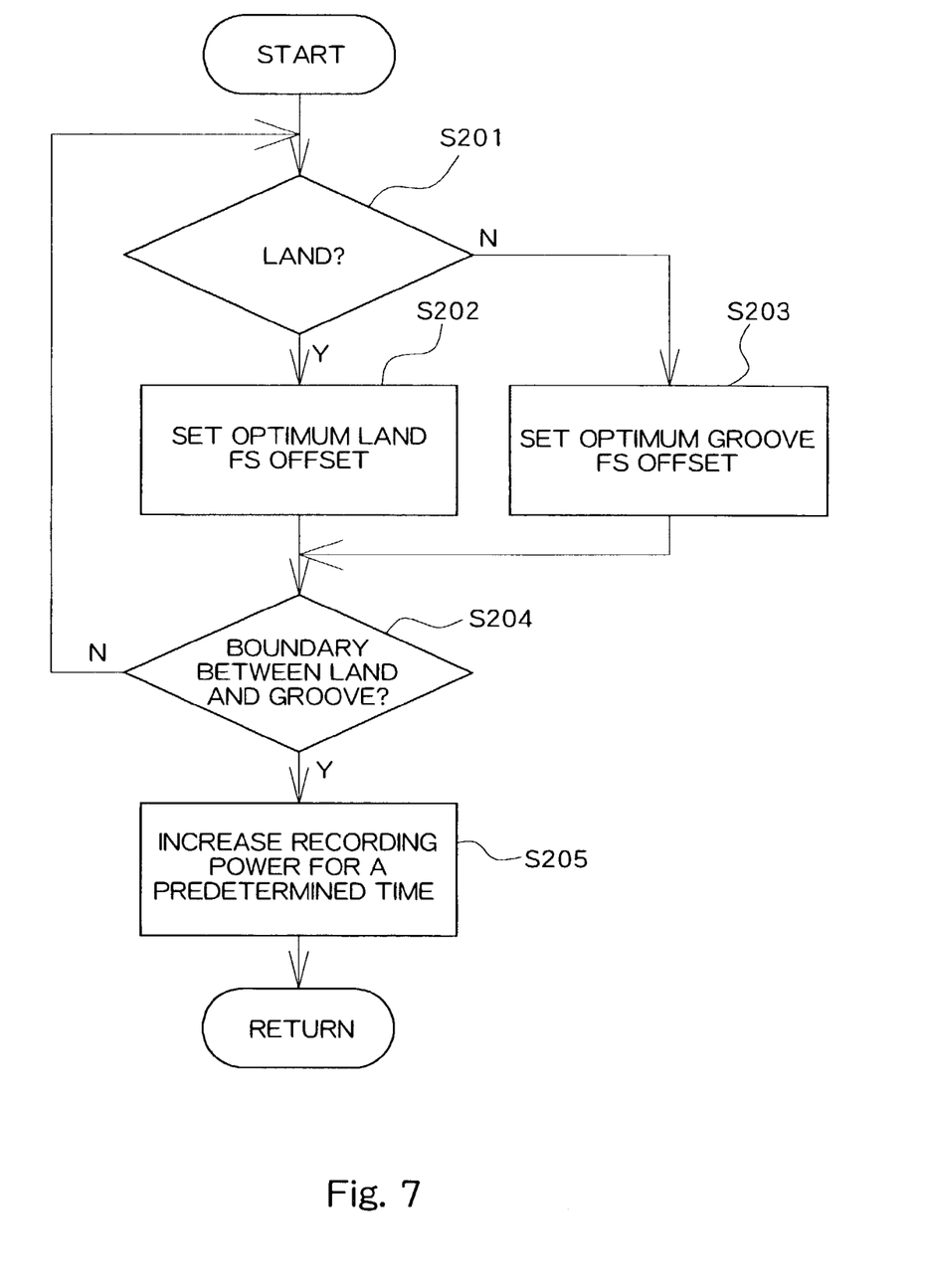
FIG. 7 is a flowchart of controlling recording power.

A flowchart for the above is substantially identical to that in FIG. 4. Specifically, as shown in FIG. 7, it is determined whether or not the recording utilizes a land (S201). When it does, a land recording FS offset is set (S202). When it does not, that is, when the recording utilizes a groove, a groove recording FS offset is set (S203).

In shifting from a land to a groove or vice versa (S204), the controller 20 supplies a control signal to the LD driver 16 so that recording power by the LD driver 16 is increased and maintained so for a predetermined amount of time or a predetermined number of marks or sectors (S205).

As described above, temporary increase of recording power when shifting from a groove to a land or vice versa can compensate for deviation from the optimum FS offset due to delay in response by the focus actuator, and thereby suppresses deterioration of recording quality. That is, when shifting from, for example, a groove to a land, data is recorded using an FS offset value between groove and land FS offsets during a period at the beginning of the recording using a land because a land recording FS offset is yet to be set (see FIG. 6D). Even so, because increased recording power, that is, recording power larger than normal recording power, is maintained during this period, a drop of irradiation power due to deviation from an FS offset can be compensated for, and desirable reproduction quality can thus be maintained.

This also applies to shifting from a land to a groove. That is, during a period at the beginning of recording using a groove, data is recorded using an FS offset between the land and groove FS offsets because a groove recording FS offset is yet to be set. Even so, because increased recording power is maintained during this period, a drop of irradiation power due to deviation from an FS offset can be compensated for, and desirable reproduction quality can be maintained.

The present invention is described in the above with reference to an embodiment, but to which the prevent invention is not limited, and various modification can be made without departing from the gist of the present invention.

For example, a gain of the focus servo may be temporarily increased, which, together with temporarily increased recording power or boosting power in an equalizer, enables more reliable suppression of deterioration of recording or reproduction quality when shifting from a land to a groove or vice versa.

What is claimed is:

1. An optical disk apparatus, comprising:
    means for irradiating a laser beam alternately to a groove and a land of an optical disk;
    means for receiving a returned beam from the optical disk to output as an RF signal;
    an equalizer for boosting at least a portion of the RF signal; and
    means for demodulating data based on a signal from the equalizer,
    wherein the equalizer increases a boost amount when shifting from the groove to the land and when shifting from the land to the groove.

2. The optical disk apparatus according to claim 1, further comprising:
    means for controlling laser beam irradiation to the groove and laser beam irradiation to the land,
    wherein
    the equalizer increases a boost amount when shifting between the groove and the land, in response to a switching signal.

3. The optical disk apparatus according to claim 1, wherein the equalizer increases a boost amount with respect to a 3T signal contained in the RF signal.

4. The optical disk apparatus according to claim 1, wherein the equalizer increases a boost amount for a predetermined amount of time from beginning of shifting from the land to the groove or from beginning of shifting from the groove to the land.

5. The optical disk apparatus according to claim 1, wherein the equalizer increases a boost amount for a predetermined number of sectors from beginning of shifting from the land to the groove or from beginning of shifting from the groove to the land.

6. The optical disk apparatus according to claim 1, further comprising:
    means for storing an optimum focus position for the groove and an optimum focus position for the land; and
    means for adjusting a focus to attain the optimum focus position for the groove when irradiating the laser beam to the groove, and to attain the optimum focus position for the land when irradiating the laser beam to the land.

7. The optical disk apparatus according to claim 6, wherein the equalizer increases a boost amount according to difference between the optimum focus position for the groove and the optimum focus position for the land.

8. An optical disk apparatus, comprising:
    an optical pick-up for irradiating a laser beam to an optical disk, and receiving a returned beam from the optical disk;
    a controller for controlling switching such that the laser beam alternately irradiates the groove and the land of the optical disk;
    a focus control circuit for controlling focusing using a groove focus offset when the laser beam irradiates the groove, and using a land focus offset when the laser beam irradiates the land;
    an equalizer for boosting at least a portion of an RF signal from the optical pick-up; and
    a decoder for demodulating a signal from the equalizer;
    wherein the equalizer temporarily increases a boost amount when shifting from the groove to the land and when shifting from the land to the groove, in response to a switching signal from the controller.

9. The optical disk apparatus according to claim 8, wherein the equalizer boosts the RF signal by a first boost amount when reproducing data recorded in the groove and when reproducing data recorded in the land, and by a second boost amount for a predetermined amount of time when shifting between the groove and the land, the second boost amount being larger than the first boost amount.

10. The optical disk apparatus according to claim 8, wherein the equalizer boosts the RF signal by a first boost amount when reproducing data recorded in the groove and when recording data recorded in the land, and by a second boost amount for a predetermined data region when shifting between the groove and the land, the second boost amount being larger than the first boost amount 11. The optical disk apparatus, comprising:
means for irradiating a laser beam alternately to a groove and a land of an optical disk to record data; and
means for adjusting power of the laser beam,
wherein the means for adjusting increases power of the laser beam when shifting from the groove to the land and when shifting from the land to the groove.

12. The optical disk apparatus according to claim 11, further comprising:
means for controlling laser beam irradiation to the groove and laser beam irradiation to the land,
wherein
the means for adjusting increases power of the laser beam when shifting between the groove and the land, in response to a switching signal from the control means.

13. The optical disk apparatus according to claim 11, wherein the means for adjusting increases power of the laser beam for a predetermined amount of time after beginning of shifting from the land to the groove or beginning of shifting from the groove to the land.

14. The optical disk apparatus according to claim 11, wherein the means for adjusting increases power of the laser beam for a predetermined number of sectors from beginning of shifting from the land to the groove or from beginning of shifting from the groove to the land.

15. The optical disk apparatus according to claim 11, wherein the means for adjusting increases power of the laser beam for a predetermined number of data items from beginning of shifting from the land to the groove or from beginning of shifting from the groove to the land.

16. The optical disk apparatus according to claim 11, further comprising:
means for storing an optimum focus position for the groove and an optimum focus position for the land; and
means for adjusting a focus to attain the optimum focus position for the groove when irradiating the laser beam to the groove, and to attain the optimum focus position for the land when irradiating the laser beam to the land.

17. The optical disk apparatus according to claim 16, wherein the means for adjusting increases power of the laser beam according to difference between the optimum focus position for the groove and the optimum focus position for the land.

18. An optical disk apparatus, comprising:
an optical pick-up for irradiating a laser beam to an optical disk, and receiving a returned beam from the optical disk;
a driver for driving a laser diode within the optical pick-up;
a controller for controlling switching such that the laser beam alternately irradiates the groove and the land of the optical disk;
a focus control circuit for controlling focusing using a groove focus offset when the laser beam irradiates the groove, and using a land focus offset when the laser beam irradiates the land;
wherein the driver temporarily increases power of the laser beam when shifting from the groove to the land and when shifting from the land to the groove, in response to a switching signal from the controller.

19. The optical disk apparatus according to claim 18, wherein the driver drives the laser diode using a first peak power when recording data in the groove and when recording data in the land, and drives the laser diode for a predetermined amount of time using a second peak power when shifting between the groove and the land, the second peak power being larger than the first peak power.

20. The optical disk apparatus according to claim 18, wherein the driver drives the laser diode using first peak power when recording data in the groove and when recording data in the land, and drives the laser diode for a predetermined amount of data using second peak power when shifting between the groove and the land, the second peak power being larger than the first peak power.

* * * * *

UNITED STATES PATENT AND TRADEMARK OFFICE
CERTIFICATE OF CORRECTION

PATENT NO. : 6,996,044 B2  
APPLICATION NO. : 10/253855  
DATED : February 7, 2006  
INVENTOR(S) : N. Takeda

Page 1 of 1

It is certified that error appears in the above-identified patent and that said Letters Patent is hereby corrected as shown below:

| COLUMN | LINE | ERROR |
| --- | --- | --- |
| (57)<br>Pg. 1, col. 2 | Abstract<br>2 of text | "grove" should read --groove-- |
| 9<br>(Claim 10, | 11<br>line 7) | "the first boost amount" should read --the first boost amount.-- |
| 9<br>(Claim 11, | 12<br>line 1) | "11. The" should read --11. An-- |
| 10<br>(Claim 18, | 20<br>line 9) | "disk;" should read --disk; and-- |

Signed and Sealed this

Twenty-second Day of August, 2006

JON W. DUDAS  
*Director of the United States Patent and Trademark Office*